(12) United States Patent
Eleftheriou et al.

(10) Patent No.: US 10,371,162 B2
(45) Date of Patent: Aug. 6, 2019

(54) INTEGRALLY BLADED FAN ROTOR

(71) Applicant: PRATT & WHITNEY CANADA CORP., Longueuil (CA)

(72) Inventors: Andreas Eleftheriou, Woodbridge (CA); Richard Ivakitch, Toronto (CA); David Menheere, Norval (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 238 days.

(21) Appl. No.: 15/286,078

(22) Filed: Oct. 5, 2016

(65) Prior Publication Data

US 2018/0094638 A1    Apr. 5, 2018

(51) Int. Cl.
*F01D 5/34*    (2006.01)
*F04D 29/32*    (2006.01)
*F02K 3/06*    (2006.01)
*F04D 19/00*    (2006.01)
*F04D 29/54*    (2006.01)
*F04D 29/64*    (2006.01)
*F01D 11/00*    (2006.01)

(52) U.S. Cl.
CPC .............. *F04D 29/329* (2013.01); *F01D 5/34* (2013.01); *F01D 11/008* (2013.01); *F02K 3/06* (2013.01); *F04D 19/002* (2013.01); *F04D 29/324* (2013.01); *F04D 29/542* (2013.01); *F04D 29/646* (2013.01); *F05D 2220/32* (2013.01); *F05D 2220/36* (2013.01); *F05D 2240/12* (2013.01); *F05D 2240/80* (2013.01); *F05D 2260/30* (2013.01); *F05D 2260/36* (2013.01); *Y02T 50/673* (2013.01)

(58) Field of Classification Search
CPC .... F04D 29/329; F04D 19/002; F04D 29/542; F04D 29/646; F02K 3/06; F05D 2220/12; F05D 2240/12; F05D 2260/30; F01D 5/3007; F01D 5/34
See application file for complete search history.

(56) References Cited

U.S. PATENT DOCUMENTS

| 3,389,889 | A |   | 6/1968  | Penny |
|---|---|---|---|---|
| 3,761,200 | A | * | 9/1973  | Gardiner ............... F01D 5/3015 415/173.7 |
| 4,883,216 | A | * | 11/1989 | Patsfall ................. B23K 20/00 228/119 |
| 5,244,345 | A |   | 9/1993  | Curtis |
| 5,540,552 | A | * | 7/1996  | Surdi .................... F01D 5/3007 416/220 R |
| 6,478,545 | B2 |  | 11/2002 | Crall et al. |
| 6,524,072 | B1 |  | 2/2003  | Brownell et al. |

(Continued)

*Primary Examiner* — Justin D Seabe
*Assistant Examiner* — Sabbir Hasan
(74) *Attorney, Agent, or Firm* — Norton Rose Fulbright Canada LLP

(57) ABSTRACT

An integrally bladed fan (IBF) rotor of a gas turbine engine. The IBF rotor includes a hub and a plurality of fan blades extending radially outwardly from the hub and integral therewith. The hub has a fan attachment flange disposed at an end of the hub on a trailing edge side thereof for mounting a booster rotor to a trailing edge side of the fan. The fan attachment flange is disposed at a radial distance from a longitudinal center axis of the integrally bladed fan rotor. The hub has an outer hub surface disposed radially inward from the radial distance of the fan attachment flange.

20 Claims, 5 Drawing Sheets

(56) References Cited

U.S. PATENT DOCUMENTS

| | | |
|---|---|---|
| 6,666,653 B1 | 12/2003 | Carrier |
| 7,963,746 B2 | 6/2011 | Baldauf et al. |
| 8,333,563 B2 | 12/2012 | Razzell |
| 8,529,208 B2 * | 9/2013 | Brault ..................... F01D 5/22 |
| | | 416/191 |
| 2006/0225867 A1 | 10/2006 | Park et al. |
| 2006/0231233 A1 | 10/2006 | Farid et al. |
| 2011/0150633 A1 * | 6/2011 | Baughman ............. F02C 3/064 |
| | | 415/129 |
| 2016/0138402 A1 | 5/2016 | Lentz |
| 2016/0146024 A1 | 5/2016 | Morris et al. |

* cited by examiner

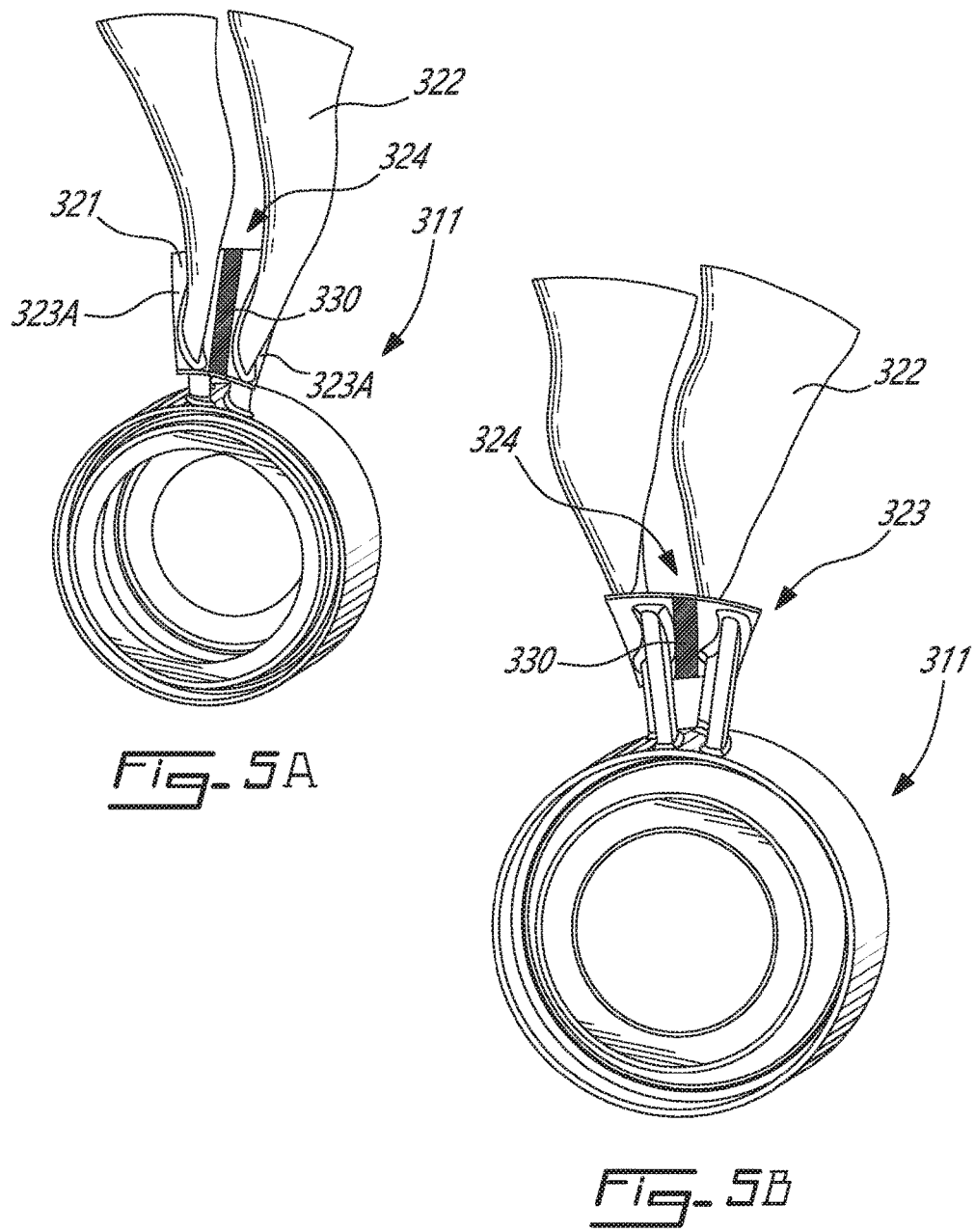

INTEGRALLY BLADED FAN ROTOR

TECHNICAL FIELD

The present disclosure relates generally to gas turbine engine fans and, more particularly, to an integrally bladed fan rotor.

BACKGROUND

Gas turbine engine fans having conventional bladed fan rotors are typically fastened directly to a downstream booster stage rotor by abutting flanges on the fan rotor and booster rotor that are bolted together. However, for some integrally bladed fan (IBF) rotors, it is difficult to access the booster rotor attachment flange. Consequently, IBF rotors are usually attached to downstream booster rotors using other configurations, which can incur a weight, design, or cost penalty.

SUMMARY

In one aspect, there is provided an integrally bladed fan rotor of a gas turbine engine, comprising a hub and a plurality of fan blades extending radially outwardly from the hub and integral therewith, the hub having a fan attachment flange disposed at an end of the hub on a trailing edge side thereof for mounting a booster rotor to a trailing edge side of the fan, the fan attachment flange disposed at a radial distance from a longitudinal center axis of the integrally bladed fan rotor, the hub having an outer hub surface disposed radially inward from the radial distance of the fan attachment flange.

In another aspect, there is provided a gas turbine engine, comprising: a rotatable booster stage having alternating rows of booster stator vanes and booster rotor blades, the booster rotor blades attached to a booster attachment flange disposed at an end of the booster stage on a leading edge side thereof upstream of the rows of booster stator vanes and booster rotor blades; and an integrally bladed fan rotor disposed upstream of the booster stage, the fan rotor comprising a hub and a plurality of fan blades extending radially outwardly from the hub and integral therewith, the hub having a fan attachment flange disposed at an end of the hub on a trailing edge side thereof and mounted to the booster attachment flange, the fan attachment flange disposed at a radial distance from a longitudinal center axis of the gas turbine engine, the hub having an outer hub surface disposed radially inward from the fan attachment flange.

In a further aspect, there is provided a method of manufacturing an integrally bladed fan rotor, comprising: integrally forming a hub and a plurality of fan blades extending radially outwardly from the hub, the hub having a circumferential fan attachment flange disposed at an end of the hub on a trailing edge side thereof; and forming a circumferential outer hub surface of the hub disposed radially inward from the fan attachment flange.

DESCRIPTION OF THE DRAWINGS

Reference is now made to the accompanying figures in which:

FIG. 5A is a front perspective view of a portion of an integrally bladed fan rotor, according to yet another embodiment of the present disclosure; and FIG. 5B is a rear perspective view of the integrally bladed fan rotor of FIG. 5A.

DETAILED DESCRIPTION

Figure 1:
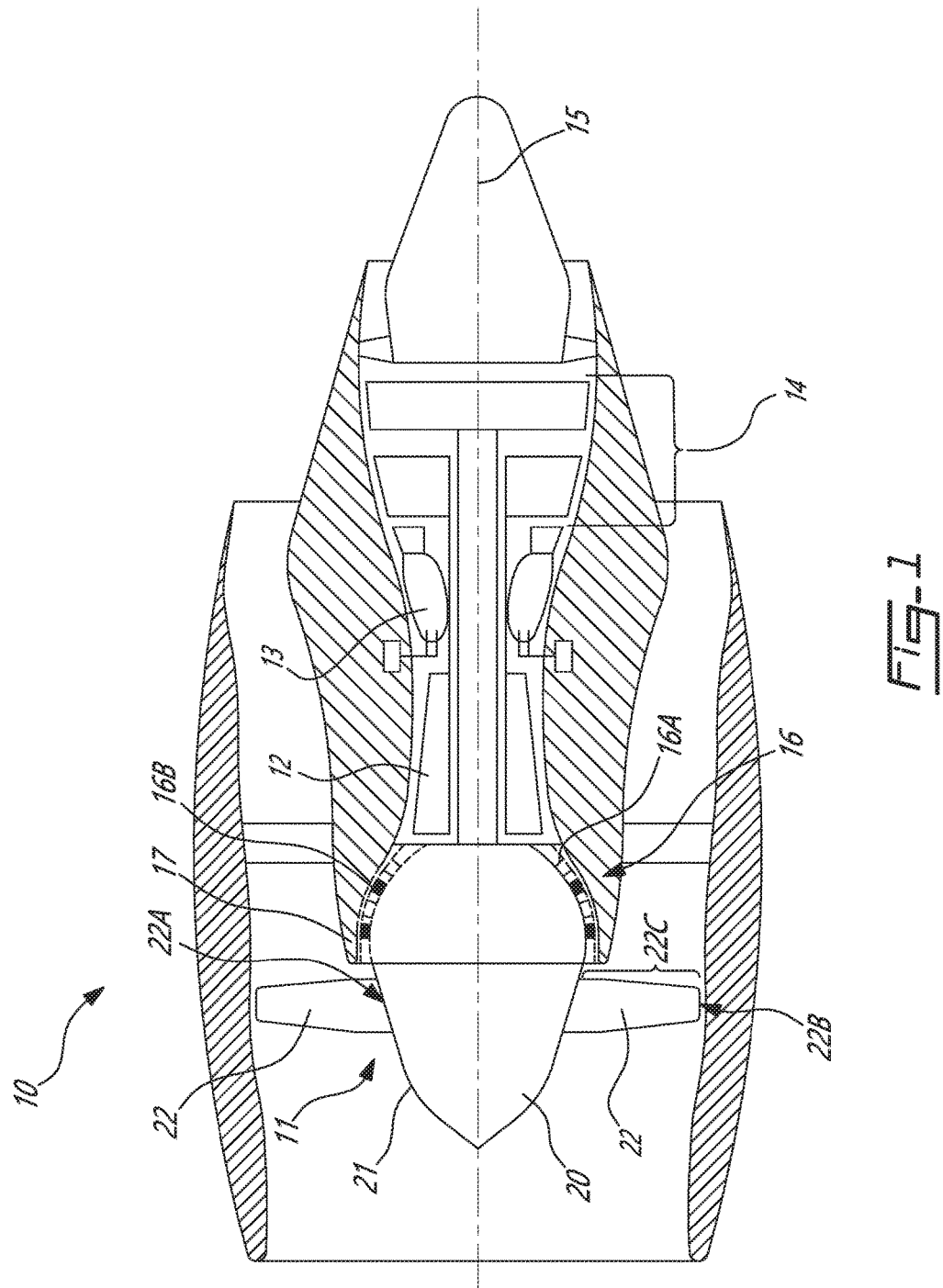
FIG. 1 is a schematic cross-sectional view of a gas turbine engine.

FIG. 1 illustrates a gas turbine engine 10 of a type preferably provided for use in subsonic flight, generally comprising in serial flow communication a fan rotor 11 through which ambient air is propelled, a compressor section 12 for pressurizing the air, a combustor 13 in which the compressed air is mixed with fuel and ignited for generating an annular stream of hot combustion gases, and a turbine section 14 for extracting energy from the combustion gases. The engine 10 also has a longitudinal center axis 15.

The fan rotor 11 as described herein is an integrally bladed rotor (IBR), which will be generally referred to herein as an integrally bladed fan (IBF) rotor 11 (or sometimes referred to simply as "IBF 11"). The IBF rotor 11 is a ducted fan that pressurizes air and diverts it into a core air stream and a bypass air stream of the engine 10. The IBF 11 has a rotatable central hub 20 which is mechanically coupled to a drive shaft and rotatable about the center axis 15. The hub 20 has an outer hub surface 21 which forms the exposed peripheral surface of the hub 20. A plurality of fan blades 22 extend radially outwardly from the hub 20 and the outer hub surface 21, and are rotatable with the hub 20. The fan blades 22 are circumferentially spaced apart about the hub 20. Each fan blade 22 extends between a radially-inner end 22A or base, and a radially-outer end 22B or tip. A radial extent or span of each fan blade 22 includes an airfoil-shaped section 22C. As will be discussed in greater detail below, the radial span of the airfoil-shaped section 22C of the fan blade 22 can vary. Each fan blade 22 also has opposed side surfaces, such as pressure side surface and a suction side surface.

The term "integrally bladed" is understood to refer to the single body construction for the IBF 11. More particularly, the fan blades 22 are integral with the hub 20 and difficult to separate therefrom once formed (for example, the blades 22 may be welded to the hub). Therefore, the IBF 11 is a single, monolithic part. This contrasts with "bladed" fan rotors which are an assembly of a central disk or hub and individual, removable blades mounted to the hub in a detachable manner. It can thus be appreciated that rather than making a bare disk and attaching blades afterward, the IBF 11 is a single body combining the two. The integrality of the IBF 11 may be obtained be integrally casting or forging the hub 20 and the fan blades 22, by machining or otherwise forming the hub 20 and fan blades 22 as a single structure whereby the blades are non-removably fixed and integrally formed with the hub, or by welding the fan blades 22 to the hub 20. Other terms in the art for an integrally bladed fan rotor include "blisk" (i.e. bladed disk), and integrally bladed rotor (IBR). Alternately, the IBF 11 may be formed of a composite core forming both the hub and the fan blades, with an outer metallic coating enveloping the composite core.

In the depicted embodiment, the hub surface 21 of the hub 20 is part of a platform 21A for the fan blades 22. Although the platform 21A is shown as being substantially continuous between the fan blades 22, in alternate embodiments, the platform 21A includes platform segments that are circumferentially spaced apart from one another.

Still referring to FIG. 1, the engine 10 also includes a booster stage 16 disposed downstream of the IBF 11, and in serial flow communication therewith. A low pressure turbine stage of the turbine section 14 is joined by a drive shaft to both the IBF 11 and the booster stage 16, such that the low pressure turbine stage provides the rotational drive to both the IBF 11 and the booster stage 16. In the depicted embodiment, a flow splitter 17 surrounds the booster stage 16 and is positioned downstream of the IBF 11. The flow splitter 17 splits the pressurized airflow provided by the IBF 11 into a radially inner or "core" stream channeled through the booster stage 16 and into the turbomachinery of the engine 10, and a radially outer or "bypass" stream channeled through a bypass duct. The core stream is provided to the booster stage 16, which further pressurizes the core stream. The pressurized air is then provided to the compressor section 12. The booster stage 16 has a plurality of alternating rows of booster stator vanes 16A and booster rotor blades 16B extending radially outwardly to work and guide the pressurized air in the core stream.

Figure 2A:
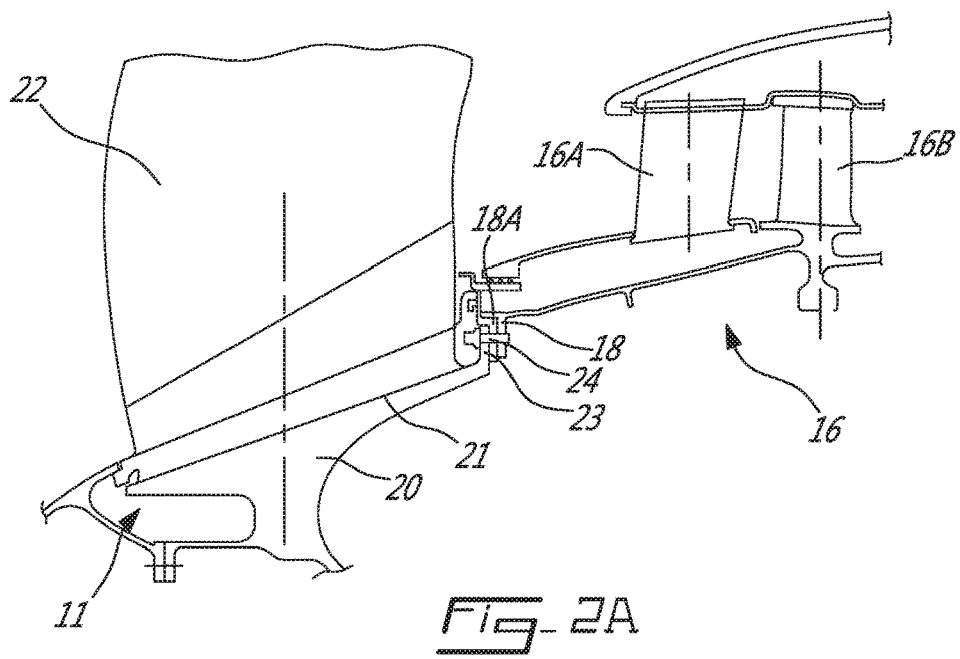
FIG. 2A is an enlarged view of an integrally bladed fan rotor and booster stage of the gas turbine engine of FIG. 1.
Figure 2B:
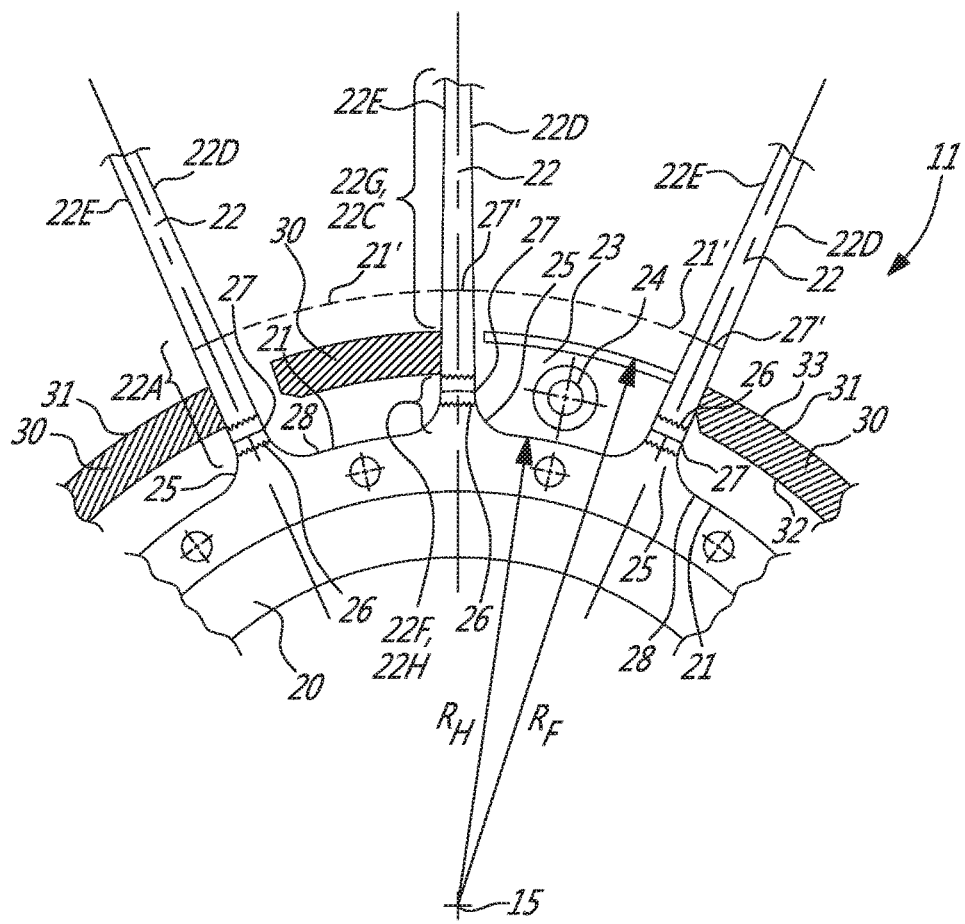
FIG. 2B is a partial front view of the integrally bladed fan rotor of FIG. 2A.

The booster stage 16 is mounted directly to the IBF 11, as is more clearly shown in FIGS. 2A and 2B. More particularly, the IBF 11 has a fan attachment flange 23 that is integral with the hub 20, and which is attached to a booster attachment flange 18 of the booster stage 16. The fan attachment flange 23 is located on the trailing edge side of the hub 20. The trailing edge side is a portion of the hub 20 located downstream of the trailing edges of the fan blades 22. Similarly, the leading edge side of the hub 20 is a portion of the hub 20 located upstream of the leading edges of the fan blades 22. The leading edge side is sometimes referred to herein for convenience as the rear end (i.e. downstream end, when the IBF 11 is mounted in the engine) of the hub 20. In the depicted embodiment, the fan attachment flange 23 has a circumferentially-extending collar projecting radially from the outer hub surface 21. The fan attachment flange 23 also has multiple fastener holes 24 which are circumferentially spaced apart along the fan attachment flange 23. In the depicted embodiment, each fastener hole 24 is disposed between two adjacent fan blades 22. This disposition of each fastener hole 24 allows a technician to access the fastener holes 24 through the fan blades 22. Each fastener hole 24 can be threaded or otherwise machined to receive therein a fastener in order to attach the fan attachment flange 23 to the booster attachment flange 18. The fan attachment flange 23 has a radial distance $R_F$ or extent, as measured from the center axis 15 of the engine. In the depicted embodiment, the radial distance $R_F$ is the distance from the center axis 15 to the radially outermost surface of the collar of the fan attachment flange 23. However, it will be appreciated that the radial distance $R_F$ can be the distance of another component or feature of the fan attachment flange 23 from the center axis 15. For example, the radial distance $R_F$ can represent the distance from the center axis 15 to the center of one of the fastener holes 24. It will thus be appreciated that the radial distance $R_F$ can vary, provided that it is greater than the distance of the circumferential outer hub surface 21 from the center axis 15, as discussed in greater detail below.

The booster attachment flange 18 is disposed at an end of the booster stage 16 on a leading edge side of its rotors and stators, and is more particularly disposed upstream of the rows of booster stator vanes 16A and booster rotor blades 16B. It may have a complementary shape to that of the fan attachment flange 23 to be abutted thereagainst. The booster attachment flange 18 also includes fastener holes 18A which align with the fastener holes 24 of the fan attachment flange 23 to receive a fastener therethrough, and to mount the booster stage 16 to the IBF 11.

Referring to FIG. 2B, the outer hub surface 21 is disposed radially inward from the fan attachment flange 23. More particularly, a radial distance $R_H$ of the outer hub surface 21 from the center axis 15 is less than the radial distance $R_F$ of the fan attachment flange 23 from the center axis 15. This relationship between the outer hub surface 21 and the fan attachment flange 23 allows a technician to access the fan attachment flange 23, thereby facilitating the mounting of the IBF 11 directly to the downstream booster stage 16. It can thus be appreciated that, in contrast to some conventional integrally bladed fan rotors, the outer hub surface 21 is "lowered" radially inwardly, which provides direct access to the fan and booster attachment flanges 24,18. More particularly, the fastener hole 24 of the fan attachment flange 23 and the fastener therein are directly accessible from a front of the IBF 11 because, unlike some conventional integrally bladed fan rotors, the radially-lower outer hub surface 21 is not obstructing access to the fastener. The direct access to the fan attachment flange 24 provided by the radially lower outer hub surface 21 reduces or eliminates the need to find other mechanical configurations to mount the IBF 11 to the booster stage 16, thus reducing weight, cost, and/or design penalties associated with these other mechanical configurations.

The disposition of the outer hub surface 21 radially inward of the fan attachment flange 23 also enables a smaller, and therefore lighter and less costly, hub 20 to be used, particularly when compared to some conventional integrally bladed fan rotors whose hub surfaces are radially outward of the fan attachment flange.

The contrast between the radially "higher" hub surface of conventional integrally bladed fan rotors and the radially lower outer hub surface 21 can be better appreciated from the following description of a possible technique for integrally forming the hub 20 and the fan blades 22. In the depicted embodiment, the hub 20 includes a plurality of circumferentially-spaced stubs 25 which extend radially outwardly from the outer hub surface 21. The radially-inner end 22A or base of each fan blade 22 is integrally attached to a corresponding stub 25 by being welded thereto to form a welded portion 26. The welded portion 26 defines a weld line 27 between the fan blade 22 and the stub 25 which has an axial and circumferential extent. The weld line 27 is disposed radially inward from the fan attachment flange 23. The weld line 27 is also disposed radially outward of the outer hub surface 21. Stated differently, and as can be clearly seen in FIG. 2B, the weld line 27 is radially disposed between the fan attachment flange 23 and the outer hub surface 21. FIG. 2B also shows the weld line 27' for a conventional integrally bladed fan rotor. As can be seen, and in contrast to the weld line 27 of the IBF 11 disclosed herein, the conventional weld line 27' is radially outward of the fan attachment flange 23. Therefore, the "higher" hub surface 21' of the conventional integrally bladed fan rotor will be radially outward of the fan attachment flange 23, and thus prevent access thereto.

Although welding is described above for forming the IBF 11, it will be appreciated that the radial lower outer hub surface 21 can also be formed using other techniques. In a particular embodiment, the outer hub surface 21 is formed by casting or forging the hub 20 to have an outer diameter that is the same as the desired outer diameter of the outer hub surface 21. In another embodiment, the radially lower outer hub surface 21 is formed by removing material from a block of material or from the hub 20 until a radial thickness of the hub 20 is decreased to the desired size. The removal of material can be performed by scalloping, such that the outer hub surface 21 is a lower scalloped surface of the hub 20.

Still referring to FIGS. 2A and 2B, it can thus be appreciated that the IBR 11 includes a hub 20 with an outer hub surface 21 that has effectively been "dropped" radially inwardly in comparison to the hub surface of a conventional integrally bladed fan rotor. The outer hub surface 21 defines a gas path surface 28 along which air flows during operation of the engine. In some engine configurations, the radially lower gas path surface 28 defined by the outer hub surface 21 may need to be raised to optimise the aerodynamic performance of the IBF 11. In such configurations, it may therefore be desired to create a "higher" gas path surface, which is now described in greater detail.

In the depicted embodiment, a plurality of gas path inserts 30 are provided. Each gas path insert 30 is a filler, cover, shroud or other object that extends circumferentially and axially between adjacent fan blades 22. The gas path inserts 30 can be removably inserted between the adjacent fan blades 22 to permit access to the fan attachment flange 23. Each gas path insert 30 has defines a radially outer gas path surface 31. More particularly, each gas path insert 30 is spaced radially outward from the outer hub surface 21, and thus radially outward of the lower gas path surface 28. Each gas path insert 30 therefore lies overtop the outer hub surface 21.

Each gas path insert 30 has a radial thickness extending between a circumferential inner insert surface 32 and a circumferential outer insert surface 33. The outer insert surface 33 defines the outer gas path surface 31 between the adjacent fan blades 22. During operation of the engine, the air flow is diverted from the lower gas path surface 28 by the gas path inserts 30, such that air flows between the fan blades 22 along the outer gas path surface 31 defined by the outer insert surface 33. It can thus be appreciated that the outer gas path surface 31 is the "actual" or "aerodynamic" gas path surface of the IBF 11 of FIGS. 2A and 2B, whereas the lower gas path surface 28 is an "artificial" pas path surface defined by the radially lower outer hub surface 21. The gas path insert 30 can be made of any suitable material, such as composite material with aluminum, and rubber. In the depicted embodiment, the weld line 27 is radially inward of the outer insert surface 33. The weld line 27 may also be radially inward of the inner insert surface 32.

Still referring to FIGS. 2A and 2B, and in a particular embodiment, each gas path insert 30 engages the pressure side surface 22D and the suction side surface 22E of the adjacent fan blades 22. The location at which each gas path insert 30 engages the fan blade 22 partitions the fan blade 22 and defines a radially inner portion 22F radially extending between the outer hub surface 21 and the gas path insert 30, and a radially outer portion 22G radially extending between the gas path insert 30 and a radially outer-end or tip 22B of the fan blade 22.

At least one of the inner portion 22F and the outer portion 22G of each fan blade have an airfoil-shaped section 22C extending along its radial, span wise length. In the depicted embodiment, only the outer portion 22G has the airfoil-shaped section 22C, such that the inner portion 22F does not have an airfoil shape. Since the inner portion 22F lies radially inward of the gas path inserts 30 which define the outer gas path surface 31, it remains out of the gas path and thus does not require an airfoil shape. It can thus be appreciated that the radial span of the airfoil-shaped section 22C of the fan blade 22 can vary. The inner portion 22F can have any suitable shape or configuration, which can be selected to optimise properties of the fan blade 22. For example, the inner portion 22F can have a simple rectangular block form to save on design and manufacturing costs. Another possible configuration is shown in FIG. 2B, where the inner portion 22F has a tuneable neck portion 22H. The tuneable neck portion 22H radially extends from the outer hub surface 21 to the airfoil-shaped section 22C, and can be coincident with a stub 25. The tuneable neck portion 22H allows for dynamically tuning the inner portion 22F to give the fan blade 22 the desired frequency/vibration response.

Figure 3:
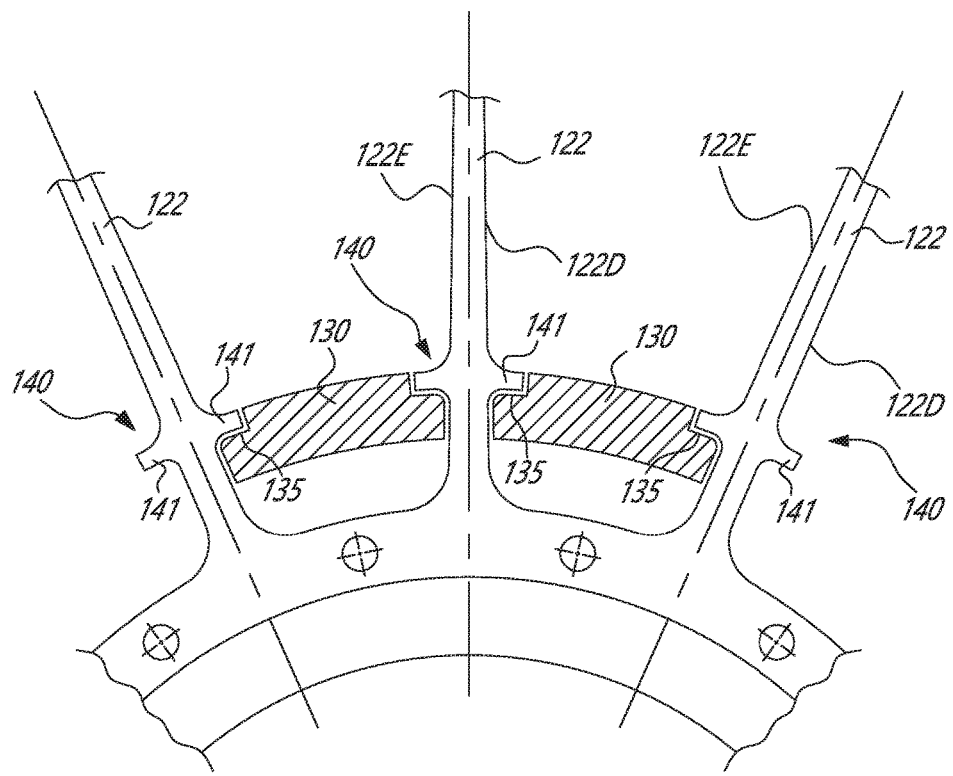
FIG. 3 is a partial a front view of an integrally bladed fan rotor, according to another embodiment of the present disclosure.

In the embodiment of FIG. 3, each of the fan blades 122 has a retention member 140. The retention member 140 engages the gas path insert 130 to mount the gas path insert 130 to the fan blades 122. It can therefore be appreciated that the retention member 140 can have any suitable shape or configuration to accomplish such functionality. In the depicted embodiment, each retention member 140 includes a protrusion 141 extending circumferentially away from both the pressure side surface 122D and the suction side surface 122E of each fan blade 122. The protrusions 141 can be integral to each fan blade 122 or attached thereto. The retention members 140 engage the circumferential ends of the gas path insert 130. In the depicted embodiment, each gas path insert 130 has a groove 135 at each of its circumferential ends for mating with the protrusions 141 of the retention members 140. The retention members 140 or the gas path inserts can serve a vibration dampening function to dampen vibration of the fan blades 122. In an alternate embodiment where the platform includes circumferentially spaced-apart platform segments, the gaps between the platform segments are filled with the gas path insert 130. In such a configuration, the gas path inserts 130 can serve a vibration dampening function to dampen vibration of the fan blades 122.

Figure 4A:
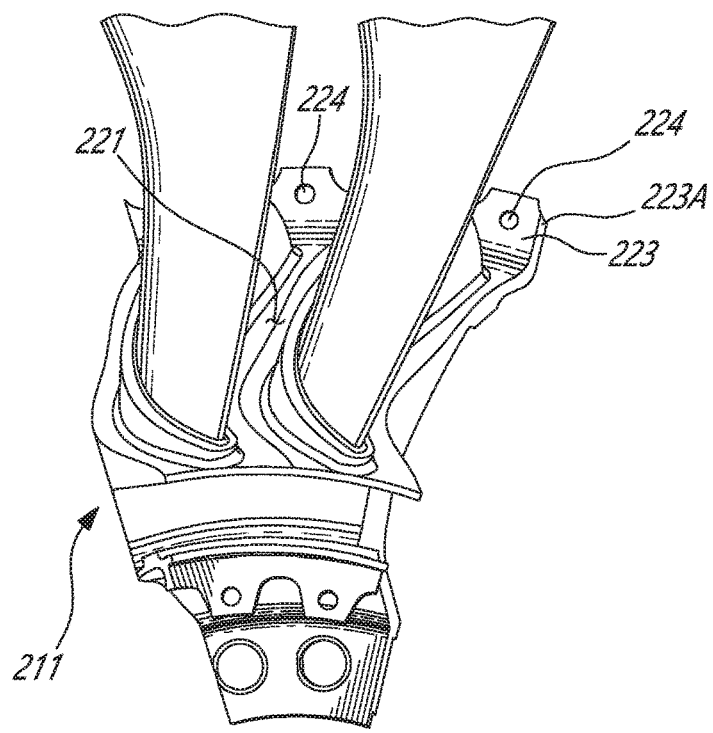
FIG. 4A is a perspective view of a portion of an integrally bladed fan rotor, according to yet another embodiment of the present disclosure.
Figure 4B:
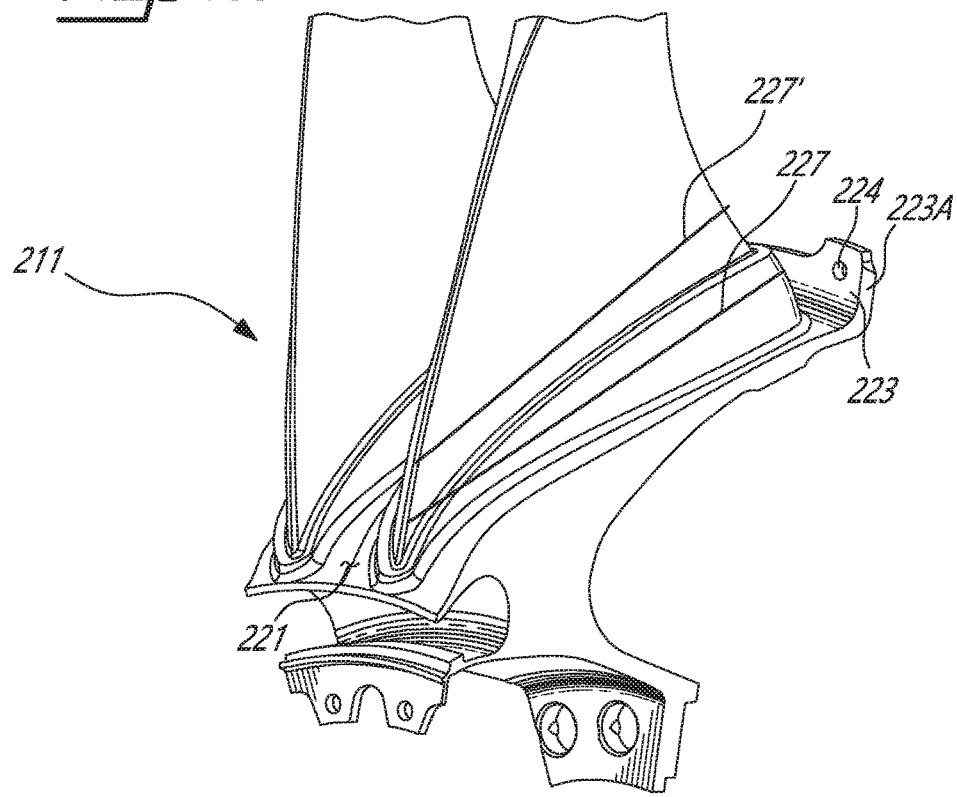
FIG. 4B is another perspective view of the integrally bladed fan rotor of FIG. 4A.

FIGS. 4A and 4B show a portion of the IBF 211, according to another embodiment. The depicted IBF 211 is shown without gas path inserts. As can be seen, the weld line 227 is disposed radially inward of the conventional weld line 227' for a conventional integrally bladed fan rotor. The outer hub surface 221 is shown radially inward of the fan attachment flange 223 and the fastener holes 224. In the depicted embodiment, the fan attachment flange 223 has a circumferentially-extending collar 223A projecting radially from the outer hub surface 221.

FIGS. 5A and 5B show a portion of the IBF 311, according to another embodiment. The hub surface 321 is defined by a platform 323 for the fan blades 322. The platform 323 includes platform segments 323A that are circumferentially spaced apart from one another to define a gap 324 therebetween. The gaps 324 between the platform segments 323A are filled with the gas path insert 330. In such a configuration, the gas path inserts 330 can serve a vibration dampening function to dampen vibration of the fan blades 322.

Referring to FIGS. 2A and 2B, there is disclosed a method of assembling the gas turbine engine 10. The engine 10 is assembled by providing the IBF 11 with the hub 20 and the integral fan blades 22. The fan attachment flange 23 of the IBF 11 is disposed at a rear end thereof, and the outer hub surface 21 is disposed radially inward from the fan attachment flange 23. The booster attachment flange 18 is abutted against the fan attachment flange 23. The fan and booster attachment flanges 23,18 are attached together to mount the booster stage 16 directly to the IBF 11.

Still referring to FIGS. 2A and 2B, there is also disclosed a method of manufacturing the IBF 11. The IBF 11 is manufactured by integrally forming the hub 20 and the fan blades 22. The fan attachment flange 23 is disposed at a rear end of the hub 20. The IBF 11 is manufactured by forming the circumferential outer hub surface 21 such that it is disposed radially inward from the fan attachment flange 23.

In light of the preceding, it can appreciated that the IBF 11,211 disclosed herein can be directly mounted to the downstream booster stage 16. For some conventional integrally bladed fan rotors, a low-pressure shaft arm is needed to join the booster stage to the low pressure shaft because the booster stage cannot be directly connected to the integrally bladed fan rotors given the difficulties of accessing the attachment flanges. The IBF 11,211 disclosed herein allows for the elimination of this mechanical arrangement, resulting in cost and weight savings, because the IBF 11,211 can be directly attached to the booster stage 16 vane or frame.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An integrally bladed fan rotor of a gas turbine engine, comprising a hub and a plurality of fan blades extending radially outwardly from the hub and integral therewith, the hub having a fan attachment flange disposed at an end of the hub on a trailing edge side thereof for mounting a booster rotor to a trailing edge side of the integrally bladed fan rotor, the fan attachment flange disposed at a radial distance from a longitudinal center axis of the integrally bladed fan rotor, the hub defining an outer peripheral surface extending circumferentially about of-the hub and disposed radially inward from the radial distance of the fan attachment flange, the plurality of fan blades entirely disposed radially outwardly from the outer peripheral surface of the hub.

2. The integrally bladed fan rotor as defined in claim 1, further comprising a plurality of gas path inserts, each gas path insert being spaced radially outward from the outer peripheral surface and extending circumferentially between adjacent fan blades of the plurality of fan blades, each gas path insert having an outer insert surface defining an outer gas path surface between the adjacent fan blades of the plurality of fan blades.

3. The integrally bladed fan rotor as defined in claim 2, wherein each gas path insert engages side surfaces of the adjacent fan blades of the plurality of fan blades and defines an inner portion of each fan blade of the plurality of fan blades radially extending between the outer peripheral surface and each gas path insert, and an outer portion of each fan blade of the plurality of fan blades radially extending between each gas path insert and a tip of the plurality of fan blades, at least the outer portion of each fan blade of the plurality of fan blades having an airfoil shape.

4. The integrally bladed fan rotor as defined in claim 3, wherein only the outer portion of each fan blade of the plurality of fan blades has the airfoil shape.

5. The integrally bladed fan rotor as defined in claim 4, wherein the inner portion of each fan blade of the plurality of fan blades includes a tuneable neck portion.

6. The integrally bladed fan rotor as defined in claim 3, wherein each fan blade of the plurality of fan blades includes a retention member protruding outwardly from a corresponding side surface of the plurality of fan blades, the retention member engaging an end of each gas path insert.

7. The integrally bladed fan rotor as defined in claim 1, wherein the hub includes a plurality of circumferentially-spaced stubs extending radially outwardly from the outer peripheral surface, a radially-inner end of each fan blade of the plurality of fan blades being integrally attached to a corresponding stub by being welded thereto to define a weld line, the weld line being disposed radially inward from the fan attachment flange.

8. The integrally bladed fan rotor as defined in claim 1, wherein the fan attachment flange has a plurality of fastener holes extending therethrough, at least one of the fastener holes being disposed circumferentially between adjacent fan blades of the plurality of fan blades.

9. A gas turbine engine, comprising: a rotatable booster stage having alternating rows of booster stator vanes and booster rotor blades, the booster rotor blades attached to a booster attachment flange disposed at an end of the booster stage on a leading edge side thereof upstream of the rows of booster stator vanes and booster rotor blades; and an integrally bladed fan rotor disposed upstream of the booster stage, the fan rotor comprising a hub and a plurality of fan blades extending radially outwardly from the hub and integral therewith, the hub having a fan attachment flange disposed at an end of the hub on a trailing edge side thereof and mounted to the booster attachment flange, the fan attachment flange disposed at a radial distance from a longitudinal center axis of the gas turbine engine, the hub defining an outer peripheral surface extending circumferentially about the hub and disposed radially inward from the fan attachment flange, the plurality of fan blades entirely disposed radially outwardly from the outer peripheral surface of the hub.

10. The gas turbine engine as defined in claim 9, further comprising a plurality of gas path inserts, each gas path insert being spaced radially outward from the outer peripheral surface and extending circumferentially between adjacent fan blades of the plurality of fan blades, each gas path insert having an outer insert surface defining an outer gas path surface between the adjacent fan blades of the plurality of fan blades.

11. The gas turbine engine as defined in claim 10, wherein each gas path insert engages side surfaces of the adjacent fan blades of the plurality of fan blades and defines an inner portion of each fan blade of the plurality of fan blades radially extending between the outer peripheral surface and each gas path insert, and an outer portion of each fan blade of the plurality of fan blades radially extending between each gas path insert and a tip of the fan blade, at least the outer portion of each fan blade of the plurality of fan blades having an airfoil shape.

12. The gas turbine engine as defined in claim 11, wherein only the outer portion of each fan blade of the plurality of fan blades has the airfoil shape.

13. The gas turbine engine as defined in claim 10, wherein each gas path insert dampens vibration of the plurality of fan blades during operation of the engine.

14. The gas turbine engine as defined in claim 11, wherein each fan blade of the plurality of fan blades includes a retention member protruding outwardly from a corresponding side surface of the fan blade, the retention member engaging an end of each gas path insert.

15. The gas turbine engine as defined in claim 9, wherein the hub includes a plurality of circumferentially-spaced stubs extending radially outwardly from the outer peripheral surface, a radially-inner end of each fan blade of the plurality of fan blades being integrally attached to a corresponding stub by being welded thereto to define a weld line, the weld line being disposed radially inward from the fan attachment flange.

16. The gas turbine engine as defined in claim 9, wherein the fan attachment flange has a plurality of fastener holes extending therethrough, at least one of the fastener holes being disposed circumferentially between adjacent fan blades of the plurality of fan blades.

17. A method of manufacturing an integrally bladed fan rotor, comprising: integrally forming a hub and a plurality of fan blades extending radially outwardly from the hub, the hub having a circumferential fan attachment flange disposed at an end of the hub on a trailing edge side thereof; and an outer peripheral surface extending circumferentially about of-the hub and disposed radially inward from the fan attachment flange, the plurality of fan blades entirely disposed radially outwardly from the outer peripheral surface of the hub.

18. The method of claim 17, wherein forming the outer peripheral surface includes removing material from the hub to decrease a radial thickness of the hub.

19. The method of claim 17, wherein forming the outer peripheral surface includes casting or forging the hub having an outer diameter corresponding to a desired outer diameter of the outer peripheral surface.

20. The method of claim 17, wherein integrally forming the hub and the plurality of fan blades includes welding the plurality of fan blades to circumferentially spaced stubs extending radially outwardly from the outer peripheral surface of the hub, a weld line being formed at a junction between each fan blade of the plurality of fan blades and a corresponding stub, the weld lines being disposed radially inward from the fan attachment flange.

* * * * *